United States Patent [19]

Shorin

[11] Patent Number: 4,806,391

[45] Date of Patent: Feb. 21, 1989

[54] SILICONE-BASED, CURABLE, PRINTABLE, HYDROPHOBIC COATING COMPOSITIONS AND PROCESSES FOR USING THE SAME

[76] Inventor: Philip Shorin, 27 W. 55th St., New York, N.Y. 10019

[21] Appl. No.: 944,196

[22] Filed: Dec. 22, 1986

Related U.S. Application Data

[63] Continuation-in-part of Ser. No. 748,128, Jun. 24, 1985, abandoned, which is a continuation of Ser. No. 376,494, May 10, 1982, abandoned.

[51] Int. Cl.[4] .................. B05D 3/02; B05D 5/00; C08G 77/06; C08G 77/12
[52] U.S. Cl. .................. 427/288; 427/387; 528/15; 528/31; 528/32
[58] Field of Search .................. 427/288, 387; 528/15, 528/31, 32

[56] References Cited

U.S. PATENT DOCUMENTS

| | | | |
|---|---|---|---|
| 3,677,178 | 7/1972 | Gipe | 430/162 X |
| 3,901,151 | 8/1975 | Crystal | 427/144 X |
| 4,269,757 | 5/1981 | Mine et al. | 528/32 X |
| 4,427,801 | 1/1984 | Sweet | 523/212 |

Primary Examiner—Michael Lusignan
Attorney, Agent, or Firm—Levisohn, Lerner & Berger

[57] ABSTRACT

Silicone-based, high solids, curable, printable, hydrophobic or release coatings or inks comprise a vinyl or hydroxyl chainstopped diorganopolysiloxane; and organic hydrogenpolysiloxane as a curing agent or crosslinker; and a curing catalyst such as a soluble compound of platinum or rhodium, or for hydroxyl chainstopped compositions only, a soluble compound of zinc, manganese, zirconium, cobalt or nickel. Up to about 45% of a vinyl or hydroxyl chainstopped organopolysiloxane resin ("MQ resin") may be included to impart better adhesion to the substrate and/or any pigments used. The combination of chainstopped polysiloxane and organic hydrogenpolysiloxane is characterized by a viscosity at 25° C. of at least about 10,000 centistokes and not more than about 60,000 centistokes. Addition of other printing components such as pigments, rheological additives, reducing oils, fillers, waxes and the like may raise the apparent viscosity of a printing varnish or ink beyond the required range without departing from the invention so long as the viscosity of the basic vehicle from which the ink or varnish was prepared lies within the required range.

28 Claims, No Drawings

SILICONE-BASED, CURABLE, PRINTABLE, HYDROPHOBIC COATING COMPOSITIONS AND PROCESSES FOR USING THE SAME

This application is a continuation-in-part of application Ser. No. 748,128, filed June 24, 1985, now abandoned, which in turn is a continuation of application Ser. No. 376,494, filed May 10, 1982, now abandoned.

BACKGROUND OF THE INVENTION

This invention relates generally to coatings and specifically to a printable silicone-based printing varnish or ink for use with printing system such as lithography, letterpress, letterset, silk screen, etc.

There is a wide variety of uses for a printed silicone-based, hydrophobic and/or release coating. Areas can be selectively printed for water repellency and/or release properties with other areas unprinted to permit other processing incompatible with such a coating. Additionally, such a hydrophobic and/or release coating or ink which is compatible with pigmentation, dyes and the like and which is selectively printable has a wide variety of uses including over-printing. All uses to which a printable coating may be put are included within the context of the present invention although not specifically catalogued herein.

Silicone-based release coatings are well known but have not been used in printing by lithography letterpress, silk screen, or the like, all of which presently employ oil-based inks.

Oil-based printing inks and varnishes constitute a major portion of all inks and varnishes in use by the printing industry today. Such inks and varnishes employ drying oils such as linseed oil, chinawood oil, etc., in conjunction with rosin-based resins such as modified phenolics, maleic modified rosin esters, etc., and hydrocarbon resins. For heat-set inks, hydrocarbon resins and rosin-based resins with or without drying oils are dissolved in petroleum-based oils, usually straight run middle distillates or hydrotreated middle distillates. Final formulations for the actual printing inks and varnishes have been prepared by the millions, and are routinely developed by those skilled in the art. "The Printing Ink Handbook" (1980) compiled by the Product and Technical Publications Committees of the National Association of Printing Ink Manufacturers, Inc., Harrison, N.Y., provides descriptions of various aspects of printing processes and inks and a glossary of terms used in the printing ink industry. This publication is expressly incorporated herein by reference.

Conventional printing inks and varnishes are commonly characterized as falling into two broad categories, "paste inks" and "fluid inks." Paste inks are relatively high solids compositions which are viscous and tacky. Letterpress, offset lithographic, letterset, intaglio and silk screen inks are all paste inks. Fluid inks are low viscosity liquids which contain large amounts of volatile solvents. Flexographic and gravure inks are typical fluid inks.

Among paste inks, letterpress, offset lithographic and letterset inks and varnishes are relatively "long," i.e., they can be drawn out into a long thread without breaking; while silk screen and intaglio inks and varnishes are relatively "short" and "buttery," i.e., a thread cannot be drawn from them without breaking.

Paste inks and varnishes for lithographic and letterpress printing are commonly measured for viscosity and yield utilizing a falling rod viscometer in accordance with ASTM Method 4040-81 at a shear rate of 2500 sec.$^{-1}$ "Tack," (expressed in gram-meters) is a measure of the internal cohesion of an ink film and thus its resistance to splitting between two rapidly moving surfaces (rolls) rather than transferring from one to the other is measured in accordance with ASTM Method D4361-84 on the Inkometer, an instrument made by the Thwing-Albert Company, Philadelphia, PA. This instrument can be operated at different speeds, and is also used to determine the effect of speed (revolutions per minute) on ink characteristics such as "misting" or "flying," "spitting" and distribution of the ink or varnish on the rollers of the instrument. "Mist" is a fine mist or spray of ink or varnish thrown off the rapidly moving surfaces (rollers) of the Inkometer or a printing press. "Spit" is blobs of ink or varnish thrown off the rollers. Spitting is characteristic of excessively viscous compositions. Experience has shown that observations of misting, spitting, or poor ink distribution on the Inkometer are strongly indicative that similar behavior will be observed on a printing press at similar speeds.

These oil-based printing inks and varnishes and their primary organic components are generally incompatible with silicone oils and resins. The solubility characteristics of silicone oils and resins are so limited that a successful printing ink or varnish vehicle based on silicones must be substantially composed of silicone ingredients.

The only reactive silicone coatings applied to the surface of substrates that are similar to substrates utilized in the printing, publication, packaging, and converting industries are silicone "release" coatings.

These release coating compositions have tradionally been solvent solutions or aqueous emulsions of reactive silicone polymers, wherein the fluid composition used for application to a substrate usually contained 3% to 15% reactive silicon polymer.

The equipment used for application of these release compositions to the substrate are Mayer rod coaters, roller coaters, reverse roll coaters, air knife coaters, trailing blade coaters, gravure roll coaters and the like. These coating systems apply 100% continuous coverage to the substrate.

With the advent of "solventless" reactive silicon polymers for release coatings as described in U.S. Pat. Nos. 4,071,644, 3,922,443, 3,936,581 and 3,928,629 the preferred method of coating is by offset gravure utilizing differential roll speeds. This method applies 100% continuous coverage to the substrate.

In brief, all of the efforts to develop release coating materials have been directed to compositions which will readily afford a continuous or 100% coverage to a substrate regardless of the method of application employed. The requirement for 100% coverage directs one to compositions which have good flow properties so that flow of the coating after application will ensure that any pinholes, minor skips, etc. are covered by the post-application flow out before curing.

These requirements are different from the flow properties required for a satisfactory printing ink or varnish. Printing requires that the applied material remain exactly as printed with as little post-application flow as is possible, preferably none at all. Any significant flow out will destroy the sharpness of the image, and in multi-color printing will lead to running or mixing of one color with another at boundaries where two (or more)

colors meet. In addition, the printing ink or varnish must have sufficient internal cohesion or tack to allow it to transfer as completely as possible from one surface to another in the printing process and to retain definition throughout the various steps which are required to ultimately transfer it to the substrate which is to be printed. Therefore, printed areas should have a continuous coating, and the unprinted areas left uncovered.

Thus the balance of properties for a printing ink or varnish is a far more complex matter than that required for the continuous coating processes of the prior art systems, with the added proviso that while the internal cohesion and flow-resistant properties must be high enough to allow definition to be retained in the printing process they cannot be too high, or poor distribution will occur and the ink or varnish will be unusable. The balance of properties will vary from one printing process to another, but given a vehicle which is operative according to the present invention, formulation for a particular printing system is readily accomplished by those skilled in the art.

For these reasons, the well-known silicone-based release coatings exhibit qualities which make them unsuitable for printing techniques such as offset lithography, letterpress, etc. For instance, the silicone release coating disclosed in U.S. Pat. No. 4,071,644 includes a two-part, curable, solventless composition, one part of which is a hydroxyl (silanol) chainstopped polysiloxane exhibiting preferably a viscosity of from 300 to 1000 ctsk. at 25° C. and the other part of which is an organic hydrogenpolysiloxane exhibiting a viscosity of from 10 to 100 ctsk. at 25° C. In another species of the invention disclosed in Example 2 in U.S. Pat. No. 4,071,644, a vinyl chainstopped polysiloxane fluid is disclosed and exhibits a viscosity of 300–1000 ctsk. at 25° C.

U.S. Pat. No. 3,922,443 discloses a two-part solventless system, one part of which is a hydroxyl chainstopped diorganopolysiloxane which has a viscosity not greater than 1,000 centipoise at 20° C. (the abstract states not greater than 5,000 centipoise), and the other part an organophydrogenpolysiloxane which has a viscosity not greater than 100 centipose at 20° C. The specific dimethylpolysiloxane employed has a viscosity of 940 centipoise at 20° C., and the formulated composition a viscosity of 740 centipoise at 20° C.

U.S. Pat. No. 3,936,581 also describes a two-part solventless system based on a hydroxyl chainstopped diorganopolysiloxane and an organohydrogenpolysiloxane. The preferred diorganopolysiloxane has a viscosity not less than 50 centipoise at 20° C., and the specific dimethylpolysiloxane employed has a viscosity of 140 centipoise. The patent also describes a solvent-based system which employs a dimethylpolysiloxane having a viscosity of 19,900 centipoise. Again the direction of the teaching of this patent is to a low-viscosity formulation to be applied to a substrate by prior art methods.

U.S. Pat. No. 3,900,617 discloses in Example 1 a vinyl chainstopped polysiloxane fluid having a viscosity of 4000 centistokes at 25° C. which is cross-linked with hydrogenpolysiloxane as disclosed in U.S. Pat. No. 4,071,644. This is employed as an aqueous emulsion which is unsuitable for printing systems referred to above.

A quite similar two-part solventless, curable silicone release coating is disclosed in U.S. Pat. No. 3,928,629 which composition exhibits a maximum viscosity of 4000 ctsk. at 25° C.

While U.S. Pat. No. 3,900,617 broadly discloses the use of aqueous emulsion employing vinyl chainstopped polysiloxanes which may exhibit viscosities up to 750,000 centistokes, the vinyl chainstopped polysiloxane specifically exemplified therein has a viscosity of 4000 ctsk. Furthermore, the aqueous emulsion is totally unsuitable for use in processes such as lithography which require the use of inks or varnishes which are immiscible with water.

All of the above compositions are based on relatively low molecular weight vinyl or hydroxyl chainstopped polydimethylsiloxanes which exhibit near-Newtonian viscosity behavior (i.e., they exhibit near constant viscosity at all but the very highest shear rates). Paste inks are characterized by non-Newtonian viscosity characteristics and exhibit a significantly higher viscosity at zero or low shear than under the high shear conditions of printing. In other words, paste inks become more fluid under shear. High viscosity at low shear means that the ink will resist static flow and retain a sharp image or definition in the printed image. Low viscosity at high shear allows good distribution of the ink or varnish on the rollers and printing plate. Therefore, the compositions of U.S. Pat. Nos. 3,900,617; 3,922,443; 3,928,629; 3,936,581 and 4,071,644 lack the properties required for paste inks and varnishes. They also exhibit a highly undesirable tendency to mist or fly excessively. Misting or flying leads to ink or varnish on undesired portions of the material being printed, on the printing press itself, and in the atmosphere and on the surfaces of the workplace. The presence of silicone oil in unwanted areas is particularly unacceptable because it can spoil not only the work in progress, but later projects as well. In addition, low viscosity fluids will run out of the ink fountains (open-bottomed troughs) used on many printing presses. Although some of these problems may be remedied by the addition of a high molecular weight silicone gum, the misting tendency cannot be suppressed by this technique.

SUMMARY OF THE INVENTION

In accordance with the present invention, it has been found that silicone-based solventless hydrophobic and/or release compositions based on vinyl or hydroxyl chainstopped polysiloxanes having viscosities between specified limits can be made into printable coatings which may be pigmented or not and applied by offset lithographic, letter press and other printing processes which presently employ oil-based inks. Formulations falling outside the preferred viscosity range may also be formulated into printing inks and varnishes which are limited to use at slower press speeds.

A silicon-based, high solids, curable, printable, hydrophobic or release coating or ink of the present invention comprises a vinyl or hydroxyl chainstopped diorganopolysiloxane; an organic hydrogenpolysiloxane as a curing agent or crosslinker; and a curing catalyst such as a soluble compound of platinum or rhodium, or for hydroxyl chainstopped compositions only, a soluble compound of zinc, manganese, zirconium, cobalt or nickel. Up to about 45% of a vinyl or hydroxyl chainstopped organopolysiloxane resin ("MQ resin" described hereinafter), may be included to impart better adhesion to the substrate and/or any pigments used. In most cases when a pigmented ink is to be prepared, it will be necessary to include an MQ resin to ensure that the pigment is bound by the vehicle and does not dust or rub off. If a top-coat is applied to a pigmented coating, the MQ resin may be omitted, as the top-coat may prevent dusting or rub off. The combination of chainstopped polysiloxane and organic hydrogenpolysiloxane (herein called the vehicle) is characterized by a viscosity at 25° C. of at least about 10,000 centistokes and not more than about 60,000 centistokes. Also within the scope of the invention are somewhat higher viscosity vehicles which have had their viscosity adjusted to fall within the required range by the addition of an appropriate amount (not more than about 20%) of a relatively high boiling saturated hydrocarbon diluent. Addition of other printing components such as pigments, rheological additives or fillers, waxes and the like may raise the apparent viscosity of a printing varnish or ink beyond the required range without departing from the invention so long as the viscosity of the basic vehicle from which the ink or varnish is prepared lies within the required range.

Accordingly, final printing inks and varnishes are prepared by formulating the vehicle with pigments, waxes, rheological addivitives or fillers, etc. in manners well understood by those skilled in the art of ink formulation.

DETAILED DESCRIPTION OF THE INVENTION

Chainstopped polydimethylsiloxanes having molecular weights which give viscosities in excess of 10,000 centistokes exhibit limited non-Newtonian viscosity behavior at shear rates characteristic of those observed in printing presses. This non-Newtonian behavior is observed at lower and lower shear rates as the molecular weight increases, and at very high molecular weights (500,000 centistoke fluids) the polydimethylsiloxanes are non-Newtonian at substantially all shear rates.

It has been found that the viscosity of a silicone-based ink vehicle can be correlated with the performance of a printing ink or varnish prepared from it. If the viscosity of the vehicle is too low, excessive misting will occur and with very low viscosities, excessive flow out will occur. If the viscosity of the vehicle is too high, the vehicle and compositions derived from it show poor ink distribution on the rollers and/or are subject to excessive spitting.

It is also characteristic of high viscosity linear polydimethylsiloxanes that their rheology is relatively independent of the nature of their end groups (chainstoppers). Since a wide variety of trimethylsilyl chainstopped polydimethylsiloxanes is readily available, they are particularly convenient for determining the optimum viscosity range (molecular weight) for use in printing processes. Four such products were tested on the Inkometer with the results shown in Table I.

TABLE I

| Viscosity (cstk.) | Tack | Speed (rpm) | Remarks: |
| --- | --- | --- | --- |
| 5,000 | 6.2 @ 1 min. to 5.6 @ 9 min. | 1200 | very heavy mist |
|  |  | 400 | very heavy mist |
| 30,000 | 10.5 @ 1 min. to 10.3 @ 10 min. | 800 | no mist |
|  | 10.9 @ 1 min. to 10.5 @ 10 min. | 1200 | no mist |
| 60,000 | 8.2 @ 1 min. to 8.5 @ 10 min. | 800 | no mist |
|  | 9.9 @ 1 min. to 5.4 @ 10 min. | 1200 | spitting |
| 100,000 | 4.2 @ 1 min. to 4.2 @ 10 min. | 800 | no visual mist |
|  | 5.4 @ 1 min. to 5.3 @ 6 min. | 1200 | spitting |

Since 400 rpm corresponds to an approximate press speed of 314 feet per minute (fpm), excessive misting at that speed indicates a composition which would require too slow a press speed to be economically acceptable for many users. A composition which does not mist at 400 rpm but does at 1200 rpm (about 942 fpm) may be suitable for use at economical press speeds. A composition which does not mist at 1200 rpm will be suitable for use at most press speeds used in the industry. Inkometer testing may also be done at even higher speeds such as 2000 rpm (about 1570 fpm). High viscosity systems generally show failure at high speeds because of spitting or poor distribution on the Inkometer roller (or both). Neither property is acceptable to the printing industry.

A series of compositions based on vinyl or hydroxyl (OH) chainstopped polydimethylsiloxanes was evaluated on the Inkometer and for Laray viscosity with the results shown in Table II. Because the addition of crosslinker or curing agent (trimethylsilyl) chainstopped polymethylhydrogensiloxane) reduces the viscosity of the system slightly, tests were run with and without the addition of 5–10% crosslinker.

TABLE II

| Viscosity (centipoise) | Chainstopper | Crosslinker | Tack @ 1200 rpm | | Misting, spitting observed | | | Laray-2500 sec.$^{-1}$ | |
| --- | --- | --- | --- | --- | --- | --- | --- | --- | --- |
|  |  |  | 1 min. | 5 min. | 400 rpm | 1200 rpm | 2000 rpm | Viscosity (Poise) | Yield Stress |
| 7,700 | OH | — | — | — | heavy mist | — | — | — | — |
| 7,700 | OH | 5% | 8.8 | — | heavy mist | — | — | — | — |
| 9,600 | OH | — | 9.0 | 8.2 | med. mist | sl. mist | — | 75 | 598 |
| 9,600 | OH | 5% | 8.4 | 7.8 | med. mist | sl. mist | — | 71 | 451 |
| 13,000 | vinyl | — | — | — | mist | — | — | — | — |
| 16,000 | vinyl | — | 10.2 | 10.0 | none | none | mist | — | — |
| 16,000 | vinyl | 5% | 9.6 | 9.6 (2 min.) | none | mist | — | — | — |
| 18,000 | OH | — | 10.6 | 10.2 | none | none | v. slight | 110 | 1248 |
| 18,000 | OH | 5% | 10.0 | 9.8 | none | none | v. slight | 97 | 1211 |
| 18,000 | OH | 10% | 9.2 | 9.0 | none | none | v. slight | 83 | 842 |
| 19,850 | vinyl | — | 10.8 | 10.6 | none | none | slight | 93 | 1664 |
| 19,850 | vinyl | 5% | 10.4 | 10.0 | none | none | slight | 77 | 1346 |
| 22,000 | OH | — | 10.4 | 10.0 | none | none | none | — | — |
| 30,000 | vinyl | — | 11.4 | 10.0 | none | none | spits poor dist. | 123 | 2236 |
| 30,000 | vinyl | 5% | 10.8 | 10.6 | none | none | slight good dist. | 104 | 2115 |
| 31,250 | OH | — | 11.0 | 10.8 | none | none | spits | 144 | 3451 |
| 31,250 | OH | 5% | 10.4 | 10.2 | none | none | spits | 128 | 2475 |
| 34,000 | OH | — | 11.4 | 10.8 | none | none | sl. build-up | — | — |
| 41,000 | OH | — | 10.6 | 10.2 | none | spits, |  | 162 | 4358 |

TABLE II-continued

| Viscosity (centipoise) | Chainstopper | Crosslinker | Tack @ 1200 rpm 1 min. | Tack @ 1200 rpm 5 min. | Misting, spitting observed 400 rpm | Misting, spitting observed 1200 rpm | Misting, spitting observed 2000 rpm | Laray-2500 sec.$^{-1}$ Viscosity (Poise) | Laray-2500 sec.$^{-1}$ Yield Stress |
|---|---|---|---|---|---|---|---|---|---|
| 41,000 | OH | 5% | 10.8 | 10.6 | none | build-up v. sl. mist | spits, build-up | 140 | 3992 |
| 42,000 | vinyl | — | 10.6 | 10.4 | none | none | spits, build-up | 138 | 4812 |
| 42,000 | vinyl | 5% | 11.0 | 10.6 | none | none | spits, build-up | 126 | 4086 |
| 48,860 | OH | — | | | none | poor distribution | | 163 | 5198 |
| 48,860 | OH | 5% | 10.4 | 10.2 | none | spits, build-up | | 156 | 4108 |
| 48,860 | OH | 10% | 10.6 | 10.2 | none | none | spits, build-up | — | — |
| 51,000 | vinyl | — | 10.4 | 9.4 (2 min.) | none | spits, poor distribution | | — | — |
| 51,000 | vinyl | 5% | 10.8 | 10.4 (4 min.) | none | spits, poor distribution | | — | — |
| 54,500 | OH | — | 10.6 | — | none | spits, build-up | | 175 | 5710 |
| 54,500 | OH | 5% | 11.0 | 10.8 (3 min.) | none | spits, build-up | | 148 | 5377 |
| 59,250 | vinyl | — | 8.4 | | none | very poor distribution | | — | — |
| 59,250 | vinyl | 5% | 8.4 | | none | spits, very poor distribution | | — | — |
| 60,670 | vinyl | — | 8.0 | | none | very poor distribution | | — | — |
| 60,670 | vinyl | 5% | 9.6 | | none | very poor distribution | | — | — |

Tables I and II show clearly that compositions based on polysiloxanes having viscosities below about 10,000 centistokes show unacceptable misting at an Inkometer speed corresponding to a press speed of about 300 fpm. However, at very slow speeds they may yield acceptable prints albeit at printing speeds which probably would be uneconomic. If the base fluid viscosity is at least about 15,000 centistokes, press speeds of about 1000 fpm may be obtained without misting. Viscosities higher than about 60,000 centistokes show poor ink distribution at economical press speeds and are, therefore, less desirable, although acceptable results may be obtained at slower, less economical press speeds.

Table II also shows significant non-Newtonian behavior at shear rates characteristic of letterpress, letterset and lithographic printing processes for compositions using fluids having viscosities of about 10,000 centipoise or more. As static viscosity increases, the Laray viscosities deviate increasingly from the static viscosities. The Inkometer and Laray data also show that fluids having viscosities of about 10,000 centipoise or more meet the requirements recognized by the printing industry for letterpress, letterset and lithographic inks.

The high solids curable vehicle compositions for printing inks and varnishes of the invention comprise:
a. a vinyl chainstopped diorganopolysiloxane, or a hydroxyl chainstopped diorganopolysiloxane, or mixtures thereof;
b. an organic hydrogenpolysiloxane curing agent or crosslinker;
c. from 0 to about 45% of a vinyl chainstopped organopolysiloxane resin, hydroxyl chainstopped organopolysiloxane resin, or mixtures thereof; and
d. a catalyst for curing said composition.

The high solids curable printing ink and varnish compositions comprise the above compositions (a, b, c and d) plus
e. one or more printing components.

The preferred vinyl chainstopped diorganopolysiloxanes are vinyl chainstopped polysiloxanes having units of the formula (I):

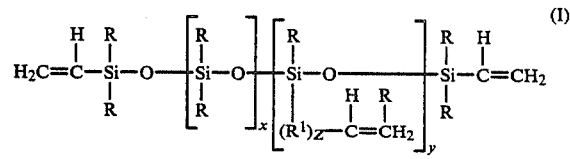

wherein each R is individually selected from: alkyl such as methyl, ethyl, octyl, etc.; cycloalkyl such as cyclohexyl, cyclopentyl, etc.; aryl such as phenyl, tolyl, xylyl, etc.; aralkyl such as benzyl, phenethyl, etc.; or halogenated aryl such as chlorophenyl, bromophenyl, chloronaphthyl, etc.; $R^1$ is a divalent organic bridging group such as alkylene, arylene, or aralylene; Z is 0 or 1, and X and Y have values such that the polysiloxane has a viscosity between about 10,000 to about 60,000 centistokes at 25° C.

The more preferred vinyl chainstopped polysiloxanes (I above) are those wherein R is substantially methyl and Z is 0 where X and Y have values which will give a viscosity between about 15,000 and about 50,000 centistokes at 25° C. Most preferred are those which have a viscosity between about 20,000 and about 40,000 centistokes at 25° C.

The preferred hydroxyl chainstopped diorganopolysiloxanes are silanol chainstopped polysiloxane having the formula (II):

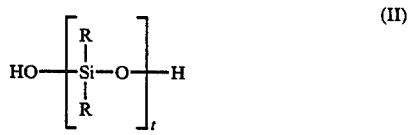

wherein R is the same as described above and t has a value such that the polysiloxane has a viscosity between about 10,000 and about 60,000 centistokes.

The more preferred hydroxyl chainstopped polysiloxanes (II above) are those wherein R is substantially methyl and t has a value which will give a viscosity between about 15,000 and about 50,000 centistokes at 25° C. Most preferred are those which have a viscosity between about 20,000 and about 40,000 centistokes at 25° C.

The best results are obtained when the silanol contains essentially no residual alkalinity. When excessive alkalinity is present, an unstable formulation may result which has a short shelf-life. A simple test for excessive alkalinity is to add about 10% crosslinker to a portion of the material to be tested. The viscosity of the mixture is taken after mixing, and the mixture is then allowed to stand, and the viscosity is compared daily to the original viscosity. If the viscosity changes moderately after the first day and there is no subsequent significant change, the material will be acceptable.

The preferred organic hydrogenpolysiloxane curing agent or crosslinker has the formula (III):

(III)

wherein R is a described above, a is 0 to 3, b is 0.005 to 2.0 and a plus b is 0.8 to 3;

The organic hydrogenpolysiloxane (curing agent or crosslinker) can vary broadly in structure and it may comprise a mixture of materials. One characteristic is that it contains a plurality of silicon-bonded hydrogen atoms per molecule which act to crosslink the other polysiloxane component(s). It may be linear or cyclic in nature. Particularly useful is a linear methylhydrogen polysiloxane or a methyl hydrogen-dimethyl polysiloxane copolymer. Although the crosslinker may be added at any stage in the preparation of a printing ink or varnish, in general, addition is withheld until shortly before the formulation is to be used. This precaution ensures maximum shelf-life for the relatively costly formulation. The addition is easily accomplished by merely stirring in the desired amount shortly before use. Usually from 1 to 10% by weight of the reactive organosilicon species of the crosslinking organohydrogen polysiloxane is required.

The vinyl or hydroxyl chainstopped organopolysiloxane resins (conventionally called "MQ resins") are very complex structures comprising a three-dimensional condensed silicate structure having random trimethylsiloxy groups and either vinyldimethylsiloxy groups (vinyl MQ) or hydroxyl groups (MQ) attached to free valences of the silicate structure. The MQ resins may be prepared by reacting approprate chlorosilanes with acidified water glass as taught in U.S. Pat. No. 2,676,182, by cohydrolysis of appropriate chlorosilanes with silicon tetrachloride, or by cohydrolysis of ethyl orthosilicate or a condensed ethyl silicate and an appropriate monoalkoxytriorganosilane.

A typical vinyl MQ resin is prepared by exhaustively reacting a mixture of trimethylsilyl chloride and vinyldimethylsilyl chloride with acidified water glass in the manner taught in U.S. Pat. No. 2,676,182. A vinyl MQ resin is present as about 40% by weight of a mixture with vinyl chainstopped polydimethylsiloxane sold by the General Electric Company as "SS-4305."

A typical MQ resin is prepared by reacting trimethylsilyl chloride with acidified water glass as taught in U.S. Pat. No. 2,676,182. MQ resin suitable for use in the present invention may be prepared by adding a preferred hydroxyl or vinyl chainstopped polysiloxane of the invention to "SR 545 Silicone Resin," a solution of MQ resin in toluene sold by the General Electric Company and stripping the aromatic solvent under reduced pressure at a temperature below about 100° C. Use of excessive heat may cause the MQ resin (or silanol chainstopped polysiloxane if used) to polymerize to such an extent that the mixture gels.

The vehicles prepared from the above components are formulatd into printing inks and varnishes by incorporation of printing components such as pigments, waxes, rheological additives or fillers and the like into the vehicle. The principles involved in ink formulation as well understood by those skilled in the art.

Inks are colored by the addition of printing pigments to a base vehicle. Broadly, pigments fall into a few general classes; black pigments such as furnace, thermal and channel blacks; white pigments such as titanium dioxide, zinc sulfide, zinc oxides, lithopones, alumina, calcium carbonate, etc.; inorganic or mineral pigments such as chrome colors, cadmium yellows and red, vermillion, Prussian blue, etc.; metallic powders; organic colors which constitute an enormous range of materials; soluble organic dyes; and mixtures thereof. The choice of colors is such that each formulator is skilled in the choice of appropriate pigments for the desired result. In general, the compositions of the present invention may be used with all types of pigments, but care must be taken to ensure that the pigment does not interfere with the catalytic action of curing catalyst especially when platinum is used as a curing catalyst. When silanol chainstopped silicones are used in the vehicle, some of the mineral pigments based on transition metals may cause premature thickening or even curing of the inks. Also, sometimes organic pigments have sufficiently active amino or acidic groups to cause premature reaction. A simple test may be used to check whether a pigment is suitable. A small amount of the vehicle is mixed with the pigment and the curing characteristics are determined by a "draw down", preparing a thin coating with a spatula or glass rod on a suitable substrate, which is then cured. Additional portions may be stored and tested at invervals to determine shelf-life. If there is interference with catalysis, the draw-downs will not cure. When pigments cause premature reaction with silanol-base fluids, significant thickening will occur with the passage of time, and eventually the system will become too thick to allow draw-downs to be prepared. The amount of printing pigment employed may vary very greatly depending on the nature of the pigment, the depth of color desired, the nature of the substrate and other variables, all of which are well-understood by those skilled in the art.

In general the amount used wil be no more than about 20 to 35% of the formulation, depending on the nature of the pigment and its rheological effects.

Other printing components or additives which may be used in formulating varnishes and inks include "waxes," lubricants, reducing oils, rheological additives and fillers.

"Waxes" are used to prevent "set-offs" (transfer of ink from a printed surface to a surface laid on it), to improve slip, and to impart scuff resistance. Printing waxes include paraffin and microcrystalline waxes, Fischer-Tropsch waxes, polyethylene waxes, waxes based on tetrafluoroethylene polymers and copolymers, fatty acid amides, mineral waxes such as montan wax, and natural waxes such as beeswax and Carnauba wax. Waxes may be added to the varnish or ink at any convenient stage in manufacture. The amount of wax, if any, to be used for a particular formulation is judged by the formulator who is skilled in the art. Generally, the amount used will not be more than about 4% of the formulation.

Reducing oils or diluents are hydrocarbon oils which are used in this invention to adjust tack, viscosity and flow characteristics. They are also used to adjust penetration of a porous substrate by the ink or varnish. Mineral spirits may be used, but their rather high vapor pressure makes the use of higher molecular weight hydrocarbons more desirable. Because aromatic hydrocarbons attack rubber components used in printing machinery, oils which are substantially free of aromatics are preferred. Particularly preferred are high-boiling hydrotreated oils such as "Magiesols" sold by the Magie Bros. Oil Co., Franklin Park, IL. These oils may be used in amounts up to about 20% by weight of the vehicle to adjust tack or bulk viscosity or both, as well as to adjust penetration in the finished formulation.

Rheological additives are high surface-area silicas or silicate-aluminates which cause an apparent thickening of a varnish or ink when added in small amounts (0.1-5% by weight). Rheological additives include silicas such as "Cab-O-Sils" sold by the Cabot Corporation, bentonite clays, etc. Fumed silicas are particularly preferred. Care must be exercised in using rheological aids in silicone-based systems to avoid adding excessive amounts. When too much (more than about 5%) is added to the vehicles of the present invention, excessive thickening will occur, rendering the resulting composition unsuitable for use as a printing ink or varnish.

Fillers are used to bulk printing inks and reduce their cost. They are relatively low surface area minerals such as clays, blanc-fixe, calcium carbonate, etc. which exhibit low surface activity. Fillers may be used in amounts up to about 20%.

Pigments and additives may sometimes be incorporated into a vehicle by merely adding them to the vehicle with good agitation. Materials which are more difficult to disperse well may be incorporated by use of three-roll mills, ball mills, sand mills, shot mills, colloid mills, Baker-Perkins mixers, Cowles dissolvers, and the like, as is well-known in the printing ink industry.

For vehicles which contain vinyl chainstopped components the curing catalyst employed in the present invention can be any of the well known platinum or rhodium catalysts which are effective for catalyzing the reaction between silicon-bonded vinyl groups and silicon-bonded hydrogen. These materials include the various finely divided elemental platinum catalysts, such as those described in Bailey, U.S. Pat. No. 2,970,150; the chloroplatinic acid catalysts described in Speier, U.S. Pat. No. 2,823,218, the platinum-hydrocarbon complexes described in Ashby, U.S. Pat. No. 3,159,601 and U.S. Pat. No. 3,139,662, the platinum alcoholate catalysts disclosed in Lamoreaux, U.S. Pat. No. 3,220,972, as well as the platinum and rhodium catalysts described in the earlier referenced U.S. Pat. Nos. 3,922,443; 3,936,581; 3,928,629; 3,900,617 and 4,071,644. Use of inhibited catalysts is strongly preferred, and often may be essential for good shelf-life. Regardless of the type of platinum or rhodium catalyst employed, the catalyst is used in an amount sufficient to provide from about $10^3$ to $10^6$ gram atoms of metal per mole of silicon-bonded vinyl groups in the composition. On another basis, a useful range of catalyst will provide one metal atom for each 100 to 1,000,000 silicon-bonded vinyl groups in the vinyl chainstopped polysiloxane. Preferably, the platinum or rhodium catalyst will be an inhibited catalyst present in an amount sufficient to provide from 5 to 500 parts per million or more of platinum or rhodium based on the weight of vinyl chainstopped polyorganosiloxane component. More preferably an inhibited platinum catalyst will be present in the amount sufficient to provide from about 25 to 50 parts per million of platinum based on the weight of polyorganosiloxane component. The catalyst may be added to the formulation at any stage in the preparation of the printing ink or varnish. If the formulation already contains the organohydrogenpolysiloxane curing agent, it may be desirable to withhold the addition of catalyst until shortly before the ink or varnish is to be used, since earlier addition may significantly shorten the shelf-life of the printing ink or varnish. When the addition is withheld until shortly before use, it is convenient to add the catalyst as a solution or dispersion of catalyst in an inert solvent or in a portion of vinyl chainstopped polysiloxane which conveniently may be a portion of the vinyl chainstopped polysiloxane used in the formulation.

The compositions which contain only silanol chainstopped polysiloxanes may be cured using the platinum catalysts described above or more preferably with 0.1-5% or more by weight as metal of transition metals such as zinc, manganese, zirconium, cobalt or nickel in the form of organic soluble salts (usually organic carboxylates). Suitable compounds include the neodecanoate, naphthenate, octoate and tallate salts of the above elements, commonly available as catalysts and as driers for paints and printing inks. The corresponding salts of transition metals such as iron and tin are not well suited for the high solids systems of this invention because they are so active that premature curing occurs. Other transition metal salts such as those of the rare earth metals, chromium and copper are not active enough to be useful at practical concentrations.

When preparing a printing ink or varnish which includes predominantly hydroxyl chainstopped polysiloxane components practical considerations of shelf-life usually make it desirable to withhold the addition of catalyst until as close to the time of use as is practicable. Solutions or dispersions of catalyst in an inert solvent are particularly convenient to use, and they may be mixed with the ink or varnish formulation by merely stirring the desired amount into the formulation. The choice and amounts of catalyt used are governed by the end use of the formulation, its desired pot-life and the cure time utilized.

The following are examples of the compositions and processes of the present invention. They are illustrative and the claims are not to be construed as limited thereby.

All parts are by weight unless specified otherwise.
Certain terms are used in the Examples as follows:
"PDMS" is polydimethylsiloxane
"MO" is hydroxyl chainstopped organopolysiloxane resin
"vinyl MQ" is vinyl chainstopped organopolysiloxane resin
"cstk" is centistoke, and may be used interchangeably with centipoise for PDMS fluids
"ppm" is parts per million
"rpm" is revolutions per minute
"tack" is expressed in gram-meters

EXAMPLE I

A vehicle suitable for formulation into a printing varnish for use as a top coat or release coating was prepared as follows:

A solution of 18 parts by weight of a high molecular weight pendant vinyl polydimethylsiloxane gum (General Electric SE-33) in 82 parts of a 425 centistoke vinyl chainstopped polydimethylsiloxane (General Electric SS-4300 from which inhibitor was omitted) was prepared by mixing in a Baker-Perkins mixer. This solution "A" exhibited a viscosity of about 92,000 centistokes.

Forty-one parts of a 60% solution of hydroxyl chainstopped organopolysiloxane (MQ resin) in toluene (General Electric SR-545) was mixed with 24.7 parts of a 425 centistoke vinyl chainstopped polydimethylsiloxane (General Electric SS-4310), 17.8 parts of a 39% solution of vinyl MQ resin in vinyl chainsstopped polydimethylsiloxane (General Electric SS-4305), and 16.3 parts of solution "A". This mixture was heated to strip off the toluene solvent, to yield 83.4 parts of vehicle "B".

The vehicle "B" was formulated into a printing varnish by adding 2.9 parts of a Fischer-Tropsch wax (Shamrock Chemical S-379 H), 2.9 parts fumed silica (Cab-O-Sil HS-5, Cabot Corporation) and 3.2 parts tetrabutyl titanate (a dispersant for the fumed silica) to 91 parts of vehicle "B". The mixture was homogenized on a three-roll mill. This mixture was tested on the Inkometer at 1200 rpm. The tack was 17.0 after one minute. The varnish was completed by the addition with stirring of 5% by weight of polymethylhydrogensiloxane (General Electric 4300c). The complete varnish exhibited a tack of 14.0 after 1 minute and 13.0 after 2 minutes.

EXAMPLE II

A suitable vehicle for a pigmented coating or ink consists by weight, essentially of approximately:

| 55% to 88% | chainstopped polysiloxane |
| 12% to 45% | an MQ polymethylsiloxane resin solution in toluene(on a dry basis). |

Preferably when vinyl chainstopped dimethylpolysiloxane (G.E. 4300) is employed with polymethylsiloxane MQ-vinyl modified resin solution (G.E. 4305), they appear in a ratio of about 3:1 to 2:1 by weight 4300 to 4305 but any ratio or even pure 4300 or pure 4305 may be employed.

The chainstopped polysiloxane and the MQ resin solution in toluene is mixed on a solution or wet basis in amounts, by weight, of approximately 20% to 75% of the said solution, which is approximately 40% toluene, with the balance chainstopped polysiloxane. The mixture is rapidly agitated and heated to drive-off the toluene. As a practical matter, the two constituents can be gradually mixed while the toluene is drawn off but at a rate sufficiently slow that the said MQ resin remains in the liquid state, it being solubilized in the chainstopped polysiloxane.

The vehicle includes the catalyst and catalyst retardant if needed.

A specific formulation was prepared as follows:

| | |
|---|---|
| 60% MQ resin in toluene (G.E. SR-545) | 1815 grams |
| 39% vinyl MQ resin in 425 cstk. vinyl chainstopped PDMS containing inhibited platinum catalyst (G.E. SS-4305) | 1869 grams |
| A material similar to solution A of Example I, but prepared using an inhibited 450 cstk. vinyl chainstopped PDMS (G.E. 4310) | 723 grams |

This mixture was heated with rapid agitation to drive off the toluene to yield about 3680 grams of vehicle.

EXAMPLE III

A blue pigmented, coating or ink formulation was prepared as follows:

| | |
|---|---|
| Product of Example II | 3338 grams |
| blue pigment (Uhlich #0500) | 711 grams |
| Fischer-Tropsch wax (Shamrock S-379 H) | 137 grams |
| tetrabutyl titanate (dispersant) | 192 grams |
| 39% vinyl MQ resin in vinyl chainstopped PDMS containing platinum catalyst (G.E. SS-4305 from which inhibitor was omitted) | 547 grams |
| Solution A of Example I | 547 grams |
| 425 cstk. vinyl chainstopped PDMS (G.E. SS-4300 from which inhibitor was omitted) | 140 grams |
| TOTAL | 5612 grams |

This mixture was homogenized on a three-roll mill. Shortly before use 6% by weight of polymethylhydrogen polysiloxane (G.E. 4300 C) was added as crosslinker. The formulation was tested on the Inkometer at 1200 rpm. The tack was 18.0 after 20 seconds, 17.8 after 60 seconds, and 17.0 after 120 seconds. Because an uninhibited catalyst was used, the shelf- or pot-life was about three hours.

EXAMPLE IV

The product of Example III was used on a commercial five-color, web-fed perfecting press to print offset and lithocoated papers from a pictorial plate at speeds of about 600 fpm. The press was equipped with a 12 foot hot air tunnel which was adjusted for a control reading of 385°–415° F. A sheeter at the end of the tunnel cut the product into sheets. The finished product showed clear definition of all the fine details of the plate, good depth of color, and generally met all requirements for a commercially acceptable print. However, at the printing speed selected there was more misting than would be commercially desirable.

For a portion of the print test, the paper feed was rearranged so that the paper passed between the printing plate and the blanket, creating a direct lithographic ("di-litho") printing system. Circumstantially, a reverse image was printed, but the results otherwise were of commercial quality. If a negative plate had been employed, a normal positive print would have been obtained.

A similar preparation using a black pigment which omitted the MQ resin and the wax of the above formulation also performed satisfactorily yielding clean, sharp prints of a commercial quality. However, because no MQ resin was included in the formula, the prints chalked or dusted. This shows that for pigmented systems it may be necessary to include resin for optimum pigment adhesion.

EXAMPLE V

The product of Example I was used on the same five-color press employed in Example IV under the same operating conditions using a solid-color plate having about the same image size as the pictorial plate used in Example IV. A sharply defined image was obtained and the coating was fully cured.

In another experiment, the product of Example III was fed to the press from the first ink station to print the pictorial image, and the product of Example I from the second ink station to print the solid image to make a wet-on-wet print. After curing in the tunnel, top-coated prints were obtained which had good definition, perfect registration, and met all requirements for a commercial product.

EXAMPLE VI

A series of organic-soluble transition metal compounds was evaluated for catalytic activity in the reaction of hydroxyl chainstopped PDMS with polymethylhydrogen siloxane. A mixture of 100 parts 30,000 cstk. PDMS with 10 parts polymethylhydrogensiloxane (General Electric 4300 c) was prepared. Sufficient transition metal solution to yield the concentration shown below was added to an aliquot of the polysiloxane mixture with stirring. A portion was withdrawn and used to prepare a drawdown on release paper. The drawdown was placed in a forced air oven at 400° F. for the time indicated. At the end of that time the drawdown was removed from the oven and allowed to cool. "Scotch" tape (#610) was applied to the drawdown. The "Scotch" tape was then removed, applied to a piece of untreated paper, and then stripped from the untreated paper. If the "Scotch" tape peeled firmly, it indicated that the drawdown had not cured sufficiently to prevent migration of material from the drawdown to the tape. If the "Scotch" tape removed fibers from the untreated paper, the cure was judged complete.

The catalyzed mixtures were tested for pot-life by allowing them to stand at room temperature and examining them from time to time for evidence of gelling (excessive thickening).

All of the transition metal compound solutions were obtained from Mooney Chemicals, Inc. The results are shown in the following Table III:

TABLE III

| Compound | % Metal in Mixture | Cure Time | Degree of Cure | Pot-life |
|---|---|---|---|---|
| "CEM ALL" copper | 0.24 | 2 min. | none | catalyst precipitated |
|  | 0.24 | 30 sec. | none |  |
| cobalt neodecanoate | 0.24 | 20 sec. | complete | gelled within 15 hr. |
|  | 0.24 | 15 sec. | complete |  |
| manganese octoate | 0.24 | 20 sec. | complete | at least 15 hr. |
| rare earth octoate | 0.24 | 1 min. | none | unreactive |
| chromium octoate | 0.16 | 1 min. | poor | gelled after 8 hr. |
|  | 0.24 | 1 min. | poor |  |
| nickel octoate | 0.16 |  | not tested | at least 24 hr. |
|  | 0.24 | 30 sec. | none |  |
|  | 0.36 | 30 sec. | questionable |  |
|  | 0.48 | 30 sec. | complete | at least 24 hr. |
| zinc octoate | 0.36 | 30 sec. | complete | at least 23 hr. |
|  | 0.24 | 30 sec. | complete |  |
| zirconium octoate | 0.24 | 35 sec. | complete | at least 10 hr. |
| iron naphthenate | 0.24 |  | not tested | gelled within 2 hr. |
|  | 0.12 | 30 sec. | no cure | gelled within 1 hr. |
| dibutyltin dilaurate |  |  | gelled while mixing |  |

These tests indicate that nickel and zinc catalysts tested afford a good combination of cure speed and shelf-life. The cobalt, manganese and zirconium catalysts afford good cure speeds but somewhat shorter shelf-lives. Copper and chromium are less useful, while rare earths are inactive. The iron and tin catalysts tested were too reactive to be useful.

Example VII

A blue ink suitable for use in lithographic or offset printing was prepared as follows:

A mixture of:

| | |
|---|---|
| 39% solution of vinyl MQ resin dissolved in 30,000 cstk. vinyl chainstopped PDMS (viscosity 29,250 cstk.) | 46 parts |
| 34% phthaloblue pigment (Magruder Color Co.) dispersed in another portion of the above solution in a Baker-Perkins mixer, and the expelled water decanted | 40 parts |
| inhibited platinum catalyst (500 ppm) in 30,000 cstk. vinyl chainstopped PDMS | 10 parts |
| tetraoctyl titanate (dispersant) | 2.5 parts |
| powdered fluorocarbon resin (Shamrock SST-2) | 1.5 parts | was homogenized on a three-roll mill. The product misted slightly on the Inkometer at 2000 rpm, but not all at 1200 rpm. At 1200 rpm the tack was 13.0 after one minute and 12.6 after five minutes. The Laray viscosity at 2500 sec.$^{-1}$ and 25° C. was 126, the yield stress 3369 dynes/cm.$^2$ Nine parts polymethylhydrogensiloxane (G.E. 4300 c) were stirred into the above product and the fully formulated ink was tested on a "Little Joe" two-color proofing press (made by "Little Joe" Color Swatcher, Inc. Somerville, NJ), using a solid print plate. The prints were cured in a forced air oven at 400° F. for thirty seconds. Excellent prints with good definition and high resistance to chalking were obtained.

EXAMPLE VIII

A clear varnish suitable for use in lithographic or offset printing was prepared as follows.
A mixture of:

| | |
|---|---|
| 30,000 cstk. vinyl chainstopped PDMS | 100 parts |
| fumed silica (Cab-O-Sil HS-5) | 2 parts |
| was homogenized in a Baker-Perkins mixer, and processed on a three-roll mill. Then | |
| polymethylhydrogen siloxane | 5 parts |
| inhibited platinum catalyst | 25 ppm pt | were added. A drawdown of the completed varnish cured in 30 seconds at 400° F. The varnish misted very slightly at 2000 rpm, and not at all at 1200 rpm. The Inkometer readings at 1200 rpm were: 1 min. 11.4, 2 min. 11.2, 3 min. 11.0, 4 min. 10.8, and 5 min. 10.8. The Laray viscosity at 25° C. and 2500 sec.$^{-1}$ was 136 poise, the yield stress was 3690 dynes/cm.$^2$ The varnish was printed using a solid-image plate on the "Little Joe" press used in Example VI using the same conditions. Excellent prints were obtained.

A blue ink of this invention and the varnish of this Example were also printed wet-on-wet on the "Little Joe". Excellent registration of the solid varnish image on top of the blue picture was obtained, and the printing product met all commercial requirements.

EXAMPLE IX

A clear varnish suitable for use in lithographic or offset printing was prepared as follows.

| | |
|---|---|
| 30,000 cstk. silanol chainstopped PDMS | 100 parts |
| polymethylhydrogensiloxane (Gen. Electric SS-4300 c) | 5 parts |
| zinc octoate (18% as zinc) in mineral spirits | 2 parts | was mixed by stirring. The resulting varnish was drawndown and cured in one minute at 400° F. It had a shelf-life in excess of 24 hours.

The Inkometer readings at 1200 rpm were: 1 min. 12.2, 2 min. 12.2, 3 min. 12.0, 4 min. 11.8, and 5 min. 11.6 There was no misting, but slight buildup and spitting, which indicated that a press speed below about 900 feet/min. would be the maximum which would give satisfactory results.

The Laray viscosity was 136 poise, and the yield stress 3974 dynes/cm.$^2$ at 2500 sec.$^{-1}$ and 25° C.

Printing this varnish as a single print was done in the same fashion as in Example VIII with excellent results.

EXAMPLE X

A red ink suitable for use in lithographic printing was prepared as follows.

Fifty-seven parts of a 70% solution of MQ resin in toluene (General Electric SR-545) were added to sixty parts of a 30,000 centistoke hydroxyl (silanol) chainstopped PDMS. The resulting mixture was placed in a rotating vacuum flask. The flask was heated to not more than 90° C. in a water bath and attached to a vacuum pump to remove substantially all of the toluene from the mixture. One hundred parts of a 40% solution of MQ resin in silanol chainstopped PDMS were obtained. This mixture exhibited a viscosity of 61,000 cstk. at 25° C. The Laray viscosity was 286 poise and the yield stress 6221 at 2500$^{-1}$ sec. This material was further formulated as below:

| | |
|---|---|
| 14 parts red pigment (Uhlich RD 5210 BON) | |
| 25 parts 40% MQ in PDMS prepared above | |
| 57.5 parts 18,000 cstk. silanol chainstopped PDMS | |
| 1.5 parts powdered polytetrafluoroethylene (Shamrock SST-2) | |
| 2.0 parts fumed silica (Cab-O-Sil HS-5) | |

This mixture was processed on a three-roll mill to yield a red ink base.

The ink was completed by stirring in 10 parts of polymethylhydrogensiloxane (General Electric SS-4300 c) and 2.66 parts of solution of zinc octoate containing 18% zinc in mineral spirits (Mooney Chemical). The complete formulation showed no misting on the Inkometer at 1200 and 2000 rpm. The tack at 1200 rpm was 9.6 at 1 minute and 9.2 at 5 minutes. The Laray viscosity was 165 poise at 25° C. at 2500$^{-1}$ sec. The yield stress was 4312. The Inkometer and Laray data defined the ink as satisfactory for use in printing.

The shelf-life of the complete formulation was more than 24 hours.

EXAMPLE XI

A blue silk screen ink was prepared as follows:

| | |
|---|---|
| 34% phthaloblue pigment in a 39% solution of vinyl MQ resin in a 30,000 cstk. vinyl chainstopped PDMS | 13.5 parts |
| 4% Cab-O-Sil in a 30,000 cstk. vinyl chainstopped PDMS | 76.5 parts |
| 0.05% platinum containing complex inhibited with 2% butyl allyl maleate in 30,000 cstk. vinyl chainstopped PDMS | 10.0 parts |
| TOTAL | 100.0 parts | were homogenized on a three-roll mill.

Nine parts of polymethylhydrogensiloxane were mixed into the above formulation by stirring.

Samples of the ink were silk-screened on supercalendered release paper and Velvo C$_2$S paper using a 200 Monotex screen, available from Advance Process Supply Co., Long Island City, N.Y. The silk screen print was line work consisting of copy and a pictorial subject. It was fully cured at 400° F. for one minute.

EXAMPLE XII

A clear silk screen varnish was prepared as follows:

| | |
|---|---|
| 30,000 centistoke vinyl chainstopped PDMS | 89 parts |
| fumed silica (Cab-O-Sil HS-5) | 1 part |
| platinum complex inhibited with butyl allyl maleate in 30,000 cstk. vinyl chainstopped PDMS | 10 parts |
| TOTAL | 100 parts | were homogenized on a three-roll mill.

Five parts of polymethylhydrogensiloxane were stirred into the above formulation.

Samples of the varnish were silk-screened on supercalendered release paper and Velco C$_2$S paper using silk screen of the previous Example and fully cured at 400°

F. for 45 seconds. The varnish showed good definition, gloss and adhesion on both papers.

EXAMPLE XIII

A red ink suitable for use in intaglio printing was prepared by blending the following mixture on a three-roll mill.

| | |
|---|---|
| 18,000 cstk. hydroxyl chainstopped PDMS | 50 parts |
| 70 cstk. hydroxyl chainstopped PDMS | 28 parts |
| red pigment (Uhlich RD-5210) | 15 parts |
| fumed silica (Cab-O-Sil HS-5) | 5 parts |
| powdered fluorocarbon resin (du Pont DLX-6000) | 1 part |
| powdered fluorocarbon resin (Shamrock SST-2) | 1 part |

When the blending was completed 4.8 parts polymethylhydrogensiloxane (Gen. Electric 4300 C) and 4.1 parts zinc octoate solution (18% zinc, Mooney Chemical) were stirred into the mixture. A portion of the resulting ink was wiped on a N.P.I.R.I. "grind gauge" so as to fill the engraved division lines leaving the surface clean. A piece of paper was placed on the gauge and squeegeed with a rubber roller. When the paper was lifted off the gauge, all of the ink in the grooves had been transferred to the paper. The paper was then placed in a forced air oven at 400° F. for 30 seconds. The print which resulted faithfully reproduced the image of the grooved grind gauge, and showed good adhesion.

The fully formulated ink had a shelf-life of one week.

EXAMPLE XIV

An uncatalyzed mixture of a 30,000 centistoke vinyl-chainstopped PDMS, 2% Cab-O-Sil HS-5 and 5% crosslinker had a tack at 1200 rpm of 11.0 after one minute through four minutes, and 10.8 after five minutes. When 10% Magiesol 40 was added to the same mixture, the tack was 10.2 over a five-minute period.

With traditional varnishes, the same reduction of tack would require only about 1% reducing oil.

What I claim is:

1. A process for applying a printable paste ink or paste varnish composition to a substrate comprising:
   charging into a printing device compatible with oil-based inks an effective amount of an uncured composition including a vehicle comprising:
   (a) a major amount of a vinyl or hydroxyl chainstopped diorganopolysiloxane or mixtures thereof;
   (b) 0 to 45% by weight of a vinyl or hydroxyl chainstopped organopolysiloxane resin or mixtures thereof;
   (c) an organophydrogen polysiloxane in an amount sufficient to achieve a desired degree of curing; and
   (d) a curing catalyst;
   printing the uncured composition onto a print product substrate; and
   applying heat to the printed composition to cure the composition to a desired degree to produce a printed product.

2. A process as in claim 1, wherein the viscosity of the diorganopolysiloxane at 25° C. is about 15,000 to about 50,000 centistokes.

3. A process as in claim 1, wherein the viscosity of the diorganopolysiloxane at 25° C. is about 20,000 to about 40,000 centistokes.

4. A process as in claim 1, wherein the organohydrogen polysiloxane is present in an amount ranging from about 1 to about 10% by weight of the combined amount of diorganopolysiloxane and organopolysiloxane resin.

5. A process as in claim 1, wherein the diorganopolysiloxane is vinyl chainstopped, the organopolysiloxane resin is vinyl chainstopped, and the catalyst is a platinum catalyst.

6. A process as in claim 1, wherein the diorganopolysiloxane is hydroxyl chainstopped, the organopolysiloxane resin is hydroxyl chainstopped, and the catalyst is selected from the group consisting of organic soluble salts of zinc, manganese, zirconium, cobalt and nickel.

7. A process as in claim 1, wherein the diorganopolysiloxane is selected from the group consisting of vinyl chainstopped polysiloxanes having units of the formula:

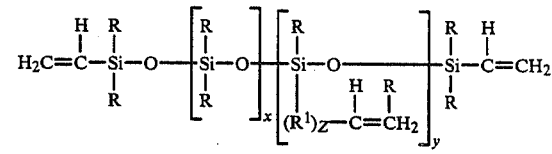

wherein each R is alkyl, cycloalkyl, aryl, aralkyl, or halogenated aryl, $R^1$ is a divalent organic bridging group such as alkylene, arylene, or aralkylene, Z is 0 or 1, and X and Y are chosen so that the polysiloxane has a viscosity of about 10,000 to about 60,000 centistokes at 25° C., hydroxyl chainstopped polysiloxanes having the formula:

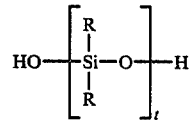

wherein each R is selected from alkyl, cycloalkyl, aryl, aralkyl, or halogenated aryl, and t is chosen so that the polysiloxane has a viscosity of about 10,000 to about 60,000 centistokes at 25° C., and mixtures thereof.

8. A process as in claim 1, wherein the diorganopolysiloxane is dimethylpolysiloxane.

9. A process as in claim 1, wherein the organohydrogenpolysiloxane is methylhydrogenpolysiloxane.

10. A process as in claim 1, wherein the organopolysiloxane resin is an MQ resin.

11. A process for applying a printable paste ink or paste varnish composition to a substrate comprising:
   charging into a printing device compatible with oil-based inks an effective amount of an uncured composition including a vehicle comprising:
   (a) a major amount of a vinyl or hydroxyl chainstopped diorganopolysiloxane or mixtures thereof;
   (b) 0 to 45% by weight of a vinyl or hydroxyl chainstopped organopolysiloxane resin or mixtures thereof;
   (c) an organo hydrogen polysiloxane in an amount sufficient to achieve a desired degree of curing; and (d) a curing catalyst; and in addition thereto a printing component selected from the group consisting of a printing pigment, printing wax, rheological additive, filler, reducing oil and mixtures thereof;

printing the uncured composition onto a print product substrate; and applying heat to the printed composition to cure the composition to a desired degree to produce a printed product.

12. A process as in claim 11, wherein the viscosity of the diorganopolysiloxane at 25° C. is about 15,000 to about 50,000 centistokes.

13. A process as in claim 11, wherein the viscosity of the diorganopolysiloxane at 25° C. is about 20,000 to about 40,000 centistokes.

14. A process as in claim 11, wherein the organohydrogen polysiloxane is present in an amount ranging from about 1 to about 10% by weight of the combined amount of diorganopolysiloxane and organopolysiloxane resin.

15. A process as in claim 11, wherein the diorganopolysiloxane is vinyl chainstopped, the organopolysiloxane resin is vinyl chainstopped, and the catalyst is a platinum catalyst.

16. A process as in claim 11, wherein the diorganopolysiloxane is hydroxyl chainstopped, the organopolysiloxane resin is hydroxyl chainstopped, and the catalyst is selected from the group consisting of organic soluble salts of zinc, manganese, zirconium, cobalt and nickel.

17. A process as in claim 11, wherein the diorganopolysiloxane is selected from the group consisting of vinyl chainstopped polysiloxanes having units of the formula:

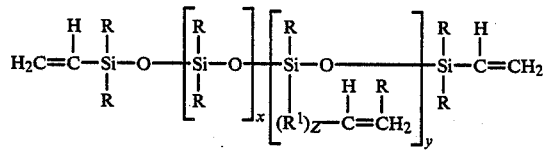

wherein each R is alkyl, cycloalkyl, aryl, aralkyl, or halogenated aryl, $R^1$ is a divalent organic bridging group such as alkylene, arylene, or aralkylene, Z is 0 or 1, and X and Y are chosen so that the polysiloxane has a viscosity of about 10,000 to about 60,000 centistokes at 25° C., hydroxyl chainstopped polysiloxanes having the formula:

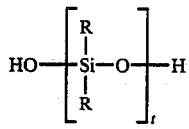

wherein each R is selected from alkyl, cycloalkyl, aryl, aralkyl, or halogenated aryl, and t is chosen so that the polysiloxane has a viscosity of about 10,000 to about 60,000 centistokes at 25° C., and mixtures thereof.

18. A process as in claim 11, wherein the diorganopolysiloxane is dimethylpolysiloxane.

19. A process as in claim 11, wherein the organohydrogenpolysiloxane is methylhydrogenpolysiloxane.

20. A process as in claim 11, wherein the organopolysiloxane resin is an MQ resin.

21. A process as in claim 11, wherein the printing component comprises a rheological additive in amount of about 0.1 to about 5% by weight of the combined amount of diorganopolysiloxane and organopolysiloxane resin.

22. A process as in claim 11, wherein the printing component is a printing pigment in an amount up to 35% by weight.

23. A process as in claim 11, wherein the printing component is a printing wax in an amount up to about 4% by weight.

24. A process as in claim 11, wherein the printing component is a reducing oil or diluent in an amount up to about 20% by weight.

25. A process as in claim 11, wherein the printing component is a filler in an amount up to about 20% by weight.

26. A process as in claim 11, further comprising sequentially charging a plurality of uncured compositions as set forth in claim 1 into a printing device and individually printing each uncured composition onto a substrate to obtain a wet-on-wet coating on the substrate.

27. A process as in claim 1, wherein the viscosity of the diorganopolysiloxane and organohydrogen polysiloxane combined is about 10,000 to about 60,000 centistokes at 25° C.

28. A process as in claim 11, wherein the viscosity of the diorganopolysiloxane and organohydrogen polysiloxane combined is about 10,000 to about 60,000 centistokes at 25° C.

* * * * *